June 10, 1947.  M. R. HUTCHISON, JR  2,422,018
CAMERA SHUTTER
Filed Oct. 12, 1945   2 Sheets-Sheet 1

MILLER R. HUTCHISON, JR.
INVENTOR

BY Newton Perrins
Donald H. Stewart
ATTORNEYS

June 10, 1947.　　　M. R. HUTCHISON, JR　　　2,422,018
CAMERA SHUTTER
Filed Oct. 12, 1945　　　2 Sheets-Sheet 2
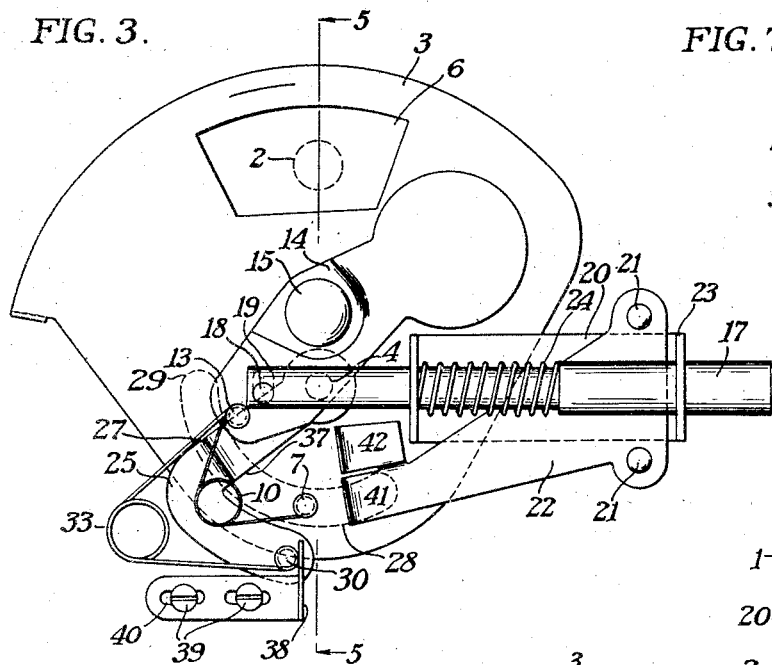
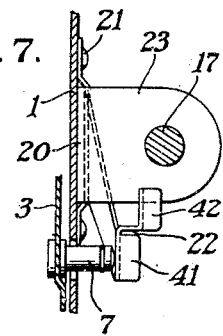
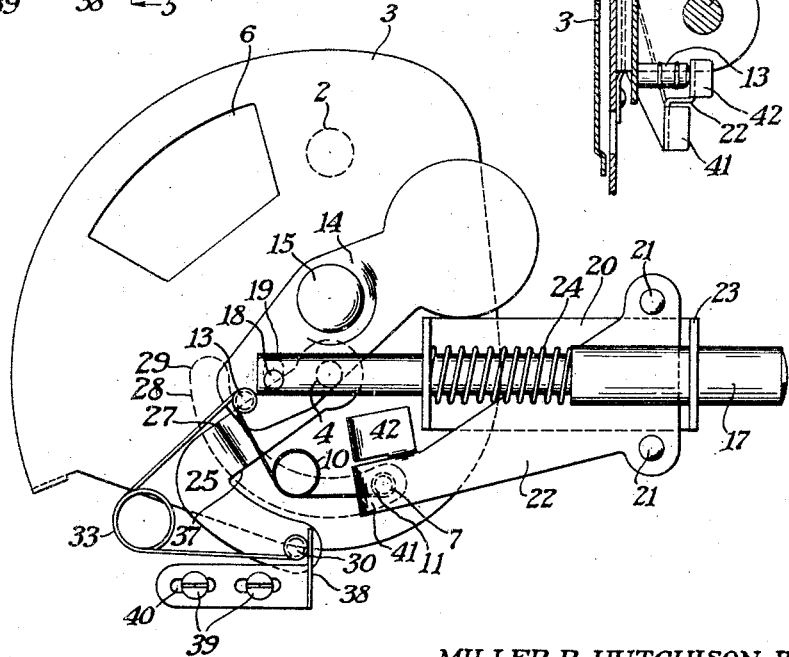
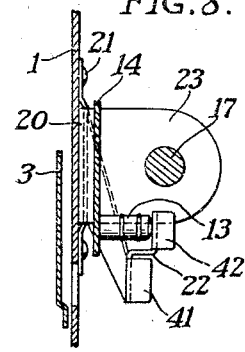
MILLER R. HUTCHISON, JR
INVENTOR
BY
ATTORNEYS Patented June 10, 1947

2,422,018

UNITED STATES PATENT OFFICE 2,422,018

CAMERA SHUTTER

Miller R. Hutchison, Jr., Rochester, N. Y., assignor to Eastman Kodak Company, Rochester, N. Y., a corporation of New Jersey Application October 12, 1945, Serial No. 622,029

11 Claims. (Cl. 95—60)

This invention relates to an inexpensive type of camera shutter. One object of my invention is to provide a camera shutter in which the speed of operation of the shutter can be controlled as a factory adjustment. Another object of my invention is to provide a shutter mechanism by which the blade may be driven at a comparatively low speed without jeopardizing the shutter blade starting movement. Another object of my invention is to provide a means for positively starting a shutter blade while at the same time using a comparatively weak camera blade driving spring. Other objects will appear from the following specification, the novel features being particularly pointed out in the claims at the end thereof.

In inexpensive camera shutters, which are usually made from thin metal punch press parts, it has usually been necessary to provide a substantial spring to operate the shutter blade in order to definitely overcome the normal friction occurring in shutters of this type, and in order to make the movement of the shutter blade sufficiently positive. Relatively heavy springs are, however, quite undesirable because they increase the speed of the shutter blade to a point where it is difficult to admit sufficient light through the relatively small aperture lenses ordinarily used with inexpensive cameras. It is desirable to have an extremely light spring on the shutter blade, but if such springs are used, the movement of the blade, and particularly the starting movement, is not sufficiently positive. In order to overcome these difficulties, I have provided a shutter structure which uses an extremely lightweight spring for the shutter blade and a considerably heavier spring which starts the shutter blade moving, permitting the shutter blade to continue its movement under the impulse of its own light spring. If necessary, or desirable, the speed of movement of the shutter blade can be controlled by controlling the extent of movement under the impulse of the heavy spring with respect to the movement of the lighter spring. Usually, I prefer to use this only as a factory adjustment because in simple shutters of this type, it is usually not desirable to provide more than one instantaneous exposure. However, it is obvious that this adjustment could be arranged for an operator to use to produce two, or perhaps three, differently-timed exposures in case this should seem desirable.

Coming now to the drawings wherein like reference characters denote like parts throughout:

Fig. 3 is a view similar to Fig. 2, with the shutter parts shown as an exposure is being made;

Fig. 4 is a view similar to Fig. 3 but with the shutter parts shown in the position they assume after an exposure has been completed and while the trigger is being held in its innermost position;

Fig. 7 is a view similar to Fig. 6, but with the shutter blade pin in a latched position; and Fig. 8 is a view similar to Fig. 7, but with the latch in a released position, this being the position the latch is in when the shutter mechanism is in its normal position of rest.

My invention consists broadly in providing a shutter mechanism with a shutter blade moving spring of just sufficient strength to move the shutter blade at the required speed and to provide a means for starting the shutter blade by means of a more powerful spring, the starting effect of which can be controlled.

Figure 5:
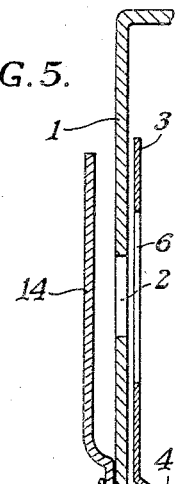
Fig. 5 is an enlarged fragmentary sectional view taken on line 5—5 of Fig. 3.

In the preferred embodiment of my invention shown in the drawings, my shutter may consist of a support 1 preferably in the form of a metal plate having an exposure aperture 2 in axial alignment with a camera lens not shown. As best shown in Fig. 5, I preferably mount a shutter blade 3 on one side of the support 1 upon a stud 4 so that the shutter blade may swing from the position of rest shown in Fig. 1 in which it may lie against a stop 5 to the position shown in Fig. 4 in which position it has completed an exposure. The shutter blade 3 is preferably of the type including a slot 6 which crosses the opening 2 to make an exposure. The size of this slot is an important factor in determining the extent of the exposure. The shutter blade 3 carries an upstanding pin or protuberance 7 including a groove 8 which may receive one end 9 of a comparatively weak hair-pin spring 10, as best indicated in Fig. 5. The other end 11 of this hair-pin spring is held in a groove 12 carried by a stud 13 mounted on a cover blind 14. The cover blind 14 may turn upon a stud 15 mounted on the support 1. This cover blind 14 is operably connected to a trigger 17 by means of a pin 18 extending into a slot 19 in the cover blind, as shown in Figs. 3 and 4. Thus, the cover blind 14 and the trigger 17 always move together.

Figure 1:
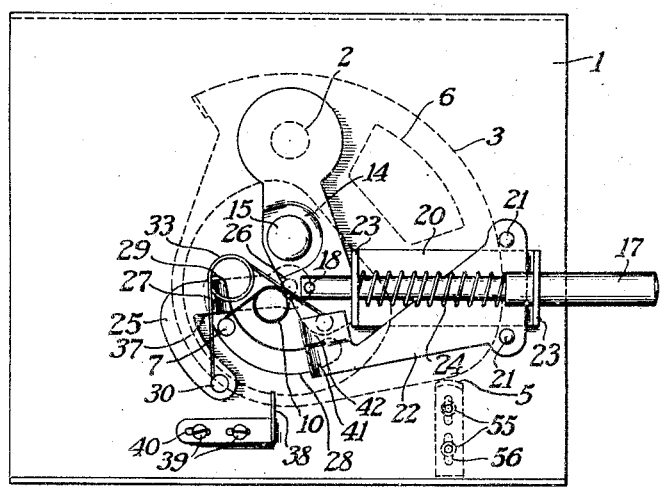
Fig. 1 is a rear elevation of a shutter constructed in accordance with, and embodying, a preferred form of my invention, the shutter parts being shown in their normal position of rest.

The trigger 17 is carried by a bracket 20 attached to the support 1 by means of rivets 21 which also pass through openings in the spring latch 22. The bracket 20 has perforated upstanding ears 23 through which the trigger 17 may slide and a spring 24 normally exerts an outward thrust upon the trigger 17 to hold it in its rest position shown in Fig. 1. Each time the trigger 17 is depressed, the pin 18 and slot 19 will cause the cover blind 14 to move, and it will thus cause the pin 13 to tension and release the spring 10, or at least to tension the spring 10, according to the adjustment of the shutter stop 5 (Fig. 1). This shutter stop enables the relationship of the pin 7 to be altered with respect to the stud 4 and with respect to the movement of the pin 18, thereby determining the amount of tension stored in spring 10 and thereby determining whether or not the spring 10 will be released entirely through movement of the trigger 17. If the adjustment is such that the shutter blade 3 is in a position for the spring 10 to be tensioned and released, this spring would move the shutter blade and make an exposure if the spring has sufficient power. I desire, however, to have this spring as light as possible, so that the shutter blade may move slowly and smoothly, and the spring 10 is usually constructed of a spring wire which may not be strong enough to reliably start the movement of the shutter blade and, consequently, in order to insure the proper starting, I have provided a starting mechanism which will now be described.

Figure 2:
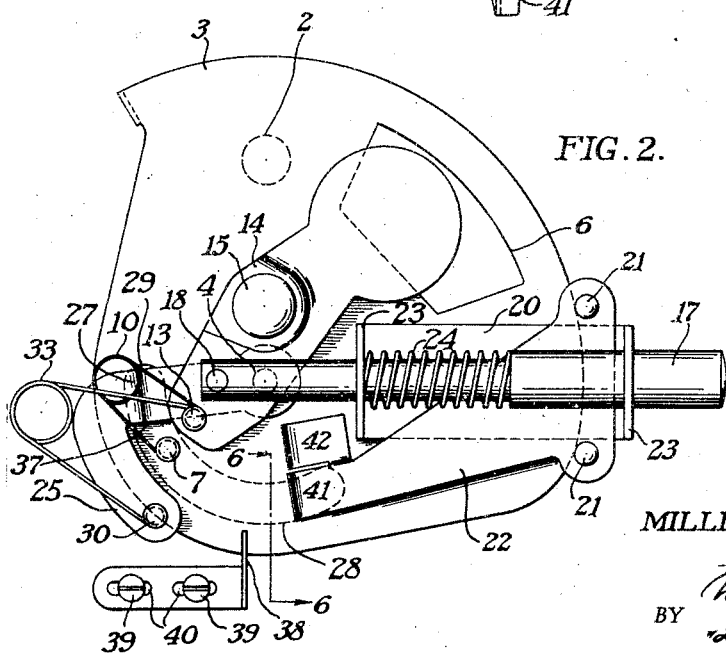
Fig. 2 is an enlarged fragmentary rear elevation similar to Fig. 1 with certain parts removed for the sake of clearness. The shutter parts are shown in the position they assume as the trigger is being depressed in being moved toward an exposure-making position.

The starting mechanism may consist of a lever 25 which is preferably pivoted on a shoulder 26 of the stud 4, so that it may turn, and is mounted coaxially with, the shutter blade 3. This lever is bent at 27 so that it may pass down through an arcuate slot 28 in the support 1 as best shown in Fig. 5. Therefore, the end 29 of the slot provides a stop, limiting the possible movement of lever 25 in one direction. The lever is provided with a stud 30 grooved at 31 to receive one end 32 of a hair-pin spring 33, the other end of which lies in a groove 34 of the stud 13. Spring 33 is materially heavier than spring 10. The position of the stud 30 relative to the cover blind pin 13 and the blade ring pin 7 is such that the spring 33 will be tensioned and released before the spring 10 is released. Therefore, the lever 25 will start to move before the shutter blade 3 starts to move, and the spring 33 will assist starting the movement of the shutter blade 3 because portion 37 of the lever will strike the blade ring pin 7 and if the spring 10 has not already been released, it will assist in releasing the spring 10 after which it may move a distance with the pin 7 before reaching a stop 38. Stop 38 may be made adjustable, as shown in Fig. 2, through the screws 39 and slots 40, the screws 39 being threaded to the support 1. After the lever 25 has stopped moving, the weak spring 10 will continue the movement of the shutter blade 3 until the slot 6 swings past the aperture 2 to make an exposure.

Figure 6:
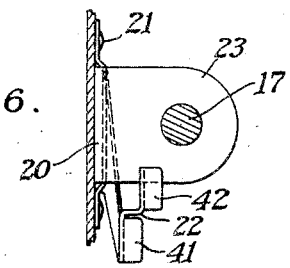
Fig. 6 is a fragmentary view partially in section showing the rebound controlling latch.

The first part of the movement of the trigger 17, of course, causes the cover blind 14 to clear the exposure aperture 2 as indicated in Figs. 2 to 4 inclusive. The shutter blade 3 swings upon its stud 4 until the pin 7 reaches the latch element 22. This latch element is shown in its rest position in Fig. 6, and in Fig. 7 the shutter blade pin 7 is shown as having passed under the turned-up lip 41 of the latch member 22 to be held thereby against further movement. Thus, the latch member 22 forms both a stop and an exposure rebound controlling latch. While I have shown the latch as only being frictional in the present instance, obviously a lip could be turned down to definitely latch the pin 7 in position. When the shutter blade is latched, it is in the position shown in Figs. 4 and 7. If, however, the operator now releases the trigger 17, it will be thrust outwardly by the spring 24 which is of sufficient power to overcome the hair-pin springs 10 and 33. The cover blind 14 will move to its Fig. 1 position and as it does so, the cover blind pin 13, which carries one end of each spring 10 and 33, will slide under a second upturned lip 42 on the spring latch 22 raising this latch so that it no longer holds the pin 7. In so doing, the shutter blade pin 7 is relieved of friction and the hair-pin spring 10 then has sufficient power to restore the shutter blade to its normal position of rest in Fig. 1, since the outward movement of the trigger 17 again tensions and releases the hair-pin springs. The hair-pin spring 33 will restore the lever 25 to its position of rest indicated in Fig. 1.

By sliding the adjustable stop 38 on the support 1, the amount of travel of the lever 25 with the edge 37 in engagement with the shutter blade pin 7 can be readily controlled. The spring 33 being materially heavier than the spring 10 causes these parts to stay in contact and, of course, the shutter blade will be driven by the spring 33 and the spring 10 during its starting movement. This makes the starting of the shutter quite positive. It may be desirable to start the shutter blade 3 by definitely causing the edge 37 to strike the pin 7. If this type of starting is required, the stop 5 may be adjusted on the support 1 by means of the screws 55 and the slots 56 until the shutter blade 3 stops in a position in which the straight edge 37 may travel some distance before striking the upstanding pin 7. These two controls—the adjustable stop 5 and the adjustable stop 38—materially assist particularly as a factory adjustment in providing the desired shutter exposure since, by limiting the travel of the lever 25, the effect of the hair-pin spring 33 can be decreased or diminished, and by adjusting the stop 5 the travel of the lever 25, before movement of the blade 3 is initiated, can also be adjusted to vary the starting movement.

Since the shutter operating spring 10 is very much lighter than the normal shutter-operating springs, and since the spring 33, while heavier than the spring 10, is still a comparatively weak spring, this improved shutter drive mechanism not only makes the operation of the shutter blade more certain than with known types of shutters using such springs, but it enables the springs to be lighter and, consequently, requires a lighter pressure upon the trigger 17 in order to operate the shutter. In addition, the spring 24 may be made somewhat lighter than is normal so that the resulting shutter drive mechanism is one which can be readily operated and one in which the shutter blade will move slowly and will start positively at each actuation.

The operation of the shutter is extremely simple since in order to make an exposure, the operator merely depresses the trigger 17 while compressing the spring 24. The operative connection between the trigger and cover blind 14—the pin 18 and slot 19—moves the cover blind 14 with the trigger. This swings the cover blind pin 13 to a position to first pass a dead center between the pivotal point of the lever 25 and the pin 30, thus tensioning and releasing the spring 33 while tensioning the spring 10. According to the adjustment of the parts, the lever may move, striking the shutter blade and starting its movement, or it may immediately engage the shutter blade pin 7 so that the shutter starts to move at the same time, or nearly the same time, as the lever 25. During this starting movement, two springs start the shutter blade 3, but as soon as the lever 25 comes to rest against the stop 38 only one spring, that is, spring 10, continues the movement of the shutter blade 3 so that it is not moved very rapidly as the exposure slot 6 closes the aperture 2. By this means I can readily obtain an exposure between a twentieth and a thirtieth of a second since exposures of this duration are generally most desirable for cameras having a single lens or an objective with a small diaphragm opening.

While I have illustrated and described a preferred embodiment of my invention by way of illustration it is obvious that various changes can be made in the parts without departing from my invention as defined in the following claims.

I claim:

1. A camera shutter comprising, in combination, an apertured support, a shutter blade pivotally mounted thereon to uncover and cover said aperture to make an exposure, a cover blind pivotally mounted on the support to uncover and cover the exposure aperture, a trigger operably connected to the cover blind to move the cover blind, spring means holding the cover blind and trigger in a position of rest in which the cover blind covers the aperture in the support, a hair pin spring connecting the shutter blade and the operably connected trigger and cover blind to be tensioned and released thereby, and a supplementary shutter blade starting mechanism acting upon the shutter blade and operable by the trigger.

2. A camera shutter comprising, in combination, an apertured support, a shutter blade pivotally mounted thereon to uncover and cover said aperture to make an exposure, a cover blind pivotally mounted on the support to uncover and cover the exposure aperture, a trigger operably connected to the cover blind to move the cover blind, spring means holding the cover blind and trigger in a position of rest in which the cover blind covers the aperture in the support, a hair pin spring connecting the shutter blade and the operably connected trigger and cover blind to be tensioned and released thereby, and a supplementary shutter blade starting mechanism acting upon the shutter blade and operable by the trigger, and means for controlling the effect of the starting mechanism.

3. A camera shutter comprising, in combination, an apertured support, a shutter blade pivotally mounted thereon to uncover and cover said aperture to make an exposure, a cover blind pivotally mounted on the support to uncover and cover the exposure aperture, a trigger operably connected to the cover blind to move the cover blind, spring means holding the cover blind and trigger in a position of rest in which the cover blind covers the aperture in the support, a hairpin spring connecting the shutter blade and the operably connected trigger and cover blind to be tensioned and released thereby, and a supplementary shutter blade starting mechanism acting upon the shutter blade and operable by the trigger, said starting mechanism including a spring, a pivoted lever adjacent said shutter blade, and a connection between the spring and trigger whereby movement of the lever may tension the spring and move the lever into driving relation with the shutter blade.

4. A camera shutter comprising, in combination, an apertured support, a shutter blade pivotally mounted thereon to uncover and cover said aperture to make an exposure, a cover blind pivotally mounted on the support to uncover and cover the exposure aperture, a trigger operably connected to the cover blind to move the cover blind, spring means holding the cover blind and trigger in a position of rest in which the cover blind covers the aperture in the support, a hairpin spring connecting the shutter blade and the operably connected trigger and cover blind to be tensioned and released thereby, and a supplementary shutter blade starting mechanism acting upon the shutter blade and operable by the trigger, said starting mechanism including a spring, a pivoted lever adjacent said shutter blade, and a connection between the spring and trigger whereby movement of the lever may tension the spring and move the lever into driving relation with the shutter blade and means for controlling the driving engagement of the lever and shutter.

5. A camera shutter comprising, in combination, an apertured support, a shutter blade pivotally mounted thereon to uncover and cover said aperture to make an exposure, a cover blind pivotally mounted on the support to uncover and cover the exposure aperture, a trigger operably connected to the cover blind to move the cover blind, spring means holding the cover blind and trigger in a position of rest in which the cover blind covers the aperture in the support, a hair-pin spring connecting the shutter blade and the operably connected trigger and cover blind to be tensioned and released thereby, and a supplementary shutter blade starting mechanism acting upon the shutter blade and operable by the trigger, said starting mechanism including a spring, a pivoted lever adjacent said shutter blade, and a connection between the spring and trigger whereby movement of the lever may tension the spring and move the lever into driving relation with the shutter blade and means for controlling the movement of the lever before engaging and moving the shutter blade.

6. A camera shutter comprising, in combination, an apertured support, a shutter blade pivotally mounted thereon to uncover and cover said aperture to make an exposure, a cover blind pivotally mounted on the support to uncover and cover the exposure aperture, a trigger operably connected to the cover blind to move the cover blind, spring means for holding the cover blind and trigger in a position of rest in which the cover blind covers the aperture in the support, a lever pivotally mounted on the support, a pair of springs, one spring interconnecting the shutter blade and the operably connected cover blind and trigger, the other spring interconnecting the lever and the operably connected cover blind and trigger, each spring being positioned for tensioning and releasing through movement of the trigger, the relative positions of the springs causing the spring connected to the lever to be tensioned and released in advance of the spring connected to the shutter; and a protuberance carried by the shutter projecting into the path of movement of the lever.

7. The shutter construction called for in claim 6 characterized by a spring latch in the path of the shutter blade protuberance to engage the protuberance and hold it against rebound, and a latch releasing pin movable with the trigger for releasing the latch.

8. The shutter construction called for in claim 6 characterized by a spring latch in the path of the shutter blade protuberance and spring pressed towards the support for catching and holding the shutter blade protuberance against movement at the end of the shutter blade movement, and a pin for engaging and moving the latch from the support when moved by the shutter trigger spring acting on the trigger to return it to its normal position of rest.

9. The shutter construction called for in claim 6 characterized by the shutter blade and cover blind being mounted on opposite sides of the support.

10. The shutter construction called for in claim 6 characterized by the shutter blade and lever being coaxially pivoted upon the support.

11. A camera shutter comprising, in combination, an apertured support, a shutter blade pivotally mounted thereon to uncover and cover said aperture to make an exposure, a cover blind pivotally mounted on the support to uncover and cover the exposure aperture, a first spring connecting the cover blind and shutter blade a trigger operably connected to the cover blind to move the cover blind, spring means for holding the cover blind and trigger in a position of rest in which the cover blind covers the aperture in the support, a supplementary shutter blade starting mechanism acting upon the shutter blade and operable by the trigger, said starting mechanism including a second spring operably connected to the trigger, a level coaxially pivoted with respect to the shutter and connected to said second spring, and interengageable parts on the lever and shutter whereby movement of the trigger may tension said lever spring causing said second spring to move said lever into starting engagement with said shutter through the interengageable parts thereof, whereby said shutter blade may be started and the movement of the shutter blade may be continued by the first spring.

MILLER R. HUTCHISON, Jr.